United States Patent
Isoya et al.

(10) Patent No.: US 11,237,035 B2
(45) Date of Patent: Feb. 1, 2022

(54) PHYSICAL QUANTITY DETECTING DEVICE

(71) Applicant: HITACHI AUTOMOTIVE SYSTEMS, LTD., Hitachinaka (JP)

(72) Inventors: Yuki Isoya, Hitachinaka (JP); Hiroaki Hoshika, Hitachinaka (JP); Takayuki Yogo, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/957,195

(22) PCT Filed: Dec. 7, 2018

(86) PCT No.: PCT/JP2018/045022
§ 371 (c)(1),
(2) Date: Jun. 23, 2020

(87) PCT Pub. No.: WO2019/131050
PCT Pub. Date: Jul. 4, 2019

(65) Prior Publication Data
US 2020/0319004 A1 Oct. 8, 2020

(30) Foreign Application Priority Data

Dec. 27, 2017 (JP) .............................. JP2017-251833

(51) Int. Cl.
*G01F 1/698* (2006.01)
*G01F 1/684* (2006.01)
*G01F 1/69* (2006.01)

(52) U.S. Cl.
CPC ............ *G01F 1/698* (2013.01); *G01F 1/6842* (2013.01); *G01F 1/69* (2013.01)

(58) Field of Classification Search
CPC .......... G01F 1/698; G01F 1/6842; G01F 1/69; G01F 1/6965; G01F 1/72; G01F 1/684; G01F 1/696
See application file for complete search history.

(56) References Cited

U.S. PATENT DOCUMENTS

| 4,578,996 A | 4/1986 | Abe |
| 2006/0005635 A1 | 1/2006 | Breen |

(Continued)

FOREIGN PATENT DOCUMENTS

| CH | 3130895 A1 * | 8/2015 |
| JP | S60-53813 A | 3/1985 |

(Continued)

OTHER PUBLICATIONS

International Search Report with English translation and Written Opinion issued in corresponding application No. PCT/JP2018/045022 dated Feb. 12, 2019.

*Primary Examiner* — Francis C Gray
(74) *Attorney, Agent, or Firm* — Foley & Lardner LLP

(57) ABSTRACT

A decrease in the accuracy after switching of the heating state can be reduced. The physical quantity detecting device includes: a flow rate detecting unit configured to include a heating element to measure a flow rate of a fluid to be measured; a heating element control unit configured to switch a control state of the heating element to any one of a heating state and a heating suppression state; and a signal processing unit configured to process a measured value of the flow rate detecting unit. When the heating element control unit switches the control state, the signal processing unit processes an estimated value determined based on a measured value of the flow rate detecting unit before the switching for a predetermined period immediately after the switching.

11 Claims, 16 Drawing Sheets

(56) References Cited

U.S. PATENT DOCUMENTS

| | | | | |
|---|---|---|---|---|
| 2009/0272187 | A1* | 11/2009 | Sukegawa | G01F 1/698 |
| | | | | 73/204.27 |
| 2014/0360262 | A1* | 12/2014 | Asano | G01F 5/00 |
| | | | | 73/204.19 |
| 2015/0226596 | A1* | 8/2015 | Baumeister | G01F 1/68 |
| | | | | 73/1.16 |
| 2017/0276527 | A1* | 9/2017 | Chen | G01F 1/32 |
| 2018/0313680 | A1* | 11/2018 | Fukaya | G01F 5/00 |

FOREIGN PATENT DOCUMENTS

| | | |
|---|---|---|
| JP | H06-33825 A | 2/1994 |
| JP | 2003-240619 A | 8/2003 |
| JP | 2009-229094 A | 10/2009 |
| JP | 2011-052965 A | 3/2011 |

* cited by examiner

FIG. 4

| TEMPERATURE ASCENDING SIDE CHARACTERISTIC | |
|---|---|
| BEFORE SWITCHING | AFTER SWITCHING |
| 80 | 100 |
| 90 | 110 |
| 100 | 123 |
| 110 | 139 |
| 120 | 160 |
| 130 | 193 |

| TEMPERATURE DESCENDING SIDE CHARACTERISTIC | |
|---|---|
| BEFORE SWITCHING | AFTER SWITCHING |
| 100 | 80 |
| 110 | 90 |
| 120 | 98 |
| 130 | 104 |
| 140 | 111 |
| 150 | 116 |

PHYSICAL QUANTITY DETECTING DEVICE

TECHNICAL FIELD

The present invention relates to a physical quantity detecting device.

BACKGROUND ART

A physical quantity detecting device that measures a flow rate by heating a heating element is known. PTL 1 discloses a flow rate measuring method for controlling a flow sensor including a heat source for intermittently heating or cooling a fluid flowing through a flow path and a temperature sensor for measuring the temperature of the fluid and for measuring two fluid flow rates having different physical property values based on a fluid temperature measured by the temperature sensor or a sensor output being a value corresponding to the fluid temperature obtained when a predetermined measurement time has elapsed from the start of heating or cooling of the heat source. The two fluids have a cross point at which the sensor output obtained when one of the fluids flows through the flow path, and the sensor output obtained when the other fluid flows through the flow path at the same flow rate as the one fluid become equal after a predetermined cross time has elapsed from the start of heating or cooling of the heat source. The measurement time is set to the cross time determined in advance.

CITATION LIST

Patent Literature

PTL 1: JP 2003-240619 A

SUMMARY OF INVENTION

Technical Problem

In the invention described in PTL 1, the measurement accuracy drops after the heating state is switched.

Solution to Problem

The physical quantity detecting device according to the first aspect of the present invention includes:
a flow rate detecting unit configured to include a heating element to measure a flow rate of a fluid to be measured;
a heating element control unit configured to switch a control state of the heating element to any one of a heating state and a heating suppression state; and
a signal processing unit configured to process a measured value of the flow rate detecting unit. When the heating element control unit switches the control state, the signal processing unit processes an estimated value determined based on a measured value of the flow rate detecting unit before the switching for a predetermined period immediately after the switching.

Advantageous Effects of Invention

According to the present invention, a decrease in the accuracy after switching of the heating state can be reduced.

BRIEF DESCRIPTION OF DRAWINGS

FIG. 4 is a diagram illustrating the temperature ascending side characteristic 835.

FIG. 5 is a diagram illustrating the temperature descending side characteristic 836.

DESCRIPTION OF EMBODIMENTS

First Embodiment

Hereinafter, a first embodiment of a physical quantity detecting device will be described with reference to FIGS. 1 to 12. In the present embodiment, the physical quantity detecting device measures the intake air of the internal combustion engine, but the measurement target of the physical quantity detecting device 300 is not limited to this.

(Hardware Configuration)

Figure 1:
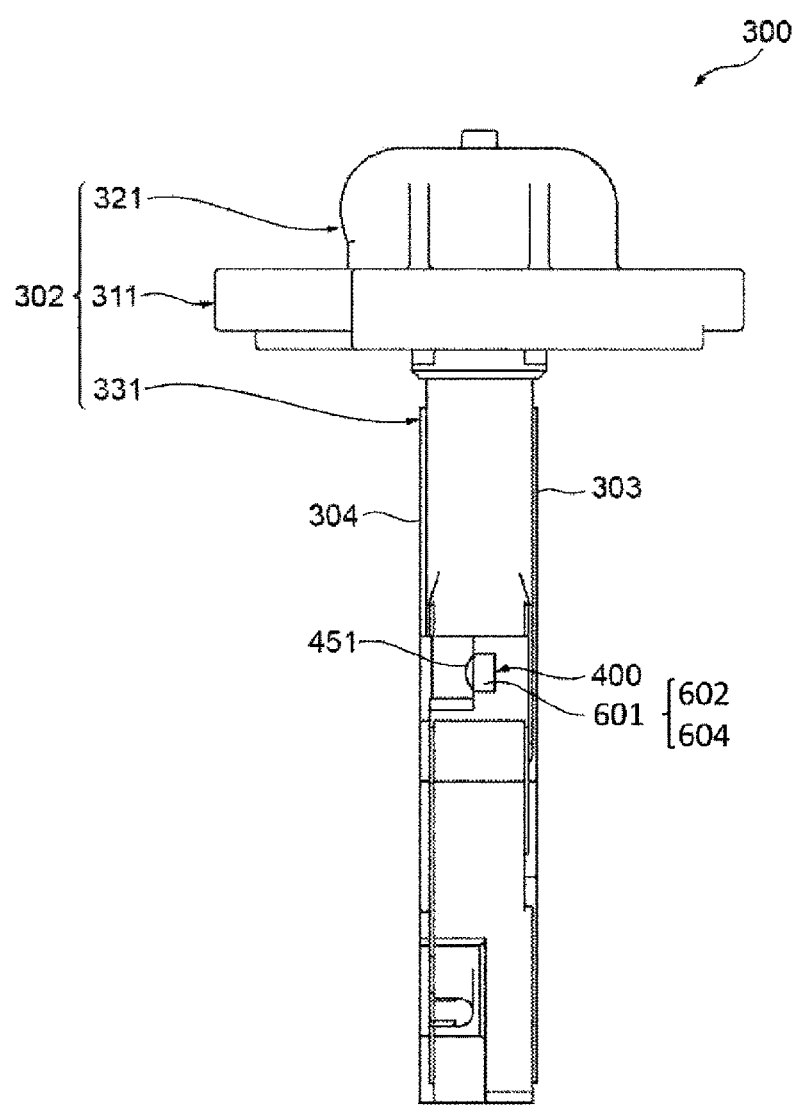
FIG. 1 is a cross-sectional view of the physical quantity detecting device 300.

FIG. 1 is a cross-sectional view of a physical quantity detecting device 300. The physical quantity detecting device 300 includes a housing 302, a front cover 303, and a back cover 304. The housing 302 is formed by molding a synthetic resin material. The housing 302 includes a flange 311 for fixing the physical quantity detecting device 300 to an intake pipe through which intake air of the internal combustion engine flows, an external connecting unit 321 including a connector for protruding from the flange 311 to perform an electrical connection with an Electronic Control Unit (hereinafter, ECU) 200, and a measuring unit 331 extending from the flange 311 so as to protrude toward the center of the intake pipe. Various communication means can be used for communication between the physical quantity detecting device 300 and the ECU 200, and the Local Interconnect Network (LIN) being one type of in-vehicle network is used, for example.

A circuit board 400 is integrally provided in the measuring unit 331 by insert molding when the housing 302 is molded. The circuit board 400 includes a flow rate detection circuit 601 for measuring the flow rate of the gas to be measured, and a temperature detecting unit 451 for detecting the temperature of the gas to be measured. The flow rate detection circuit 601 includes a flow rate detecting unit 602 and a processing unit 604. The flow rate detecting unit 602 and the temperature detecting unit 451 are arranged at positions exposed to the gas to be measured.

Figure 2:
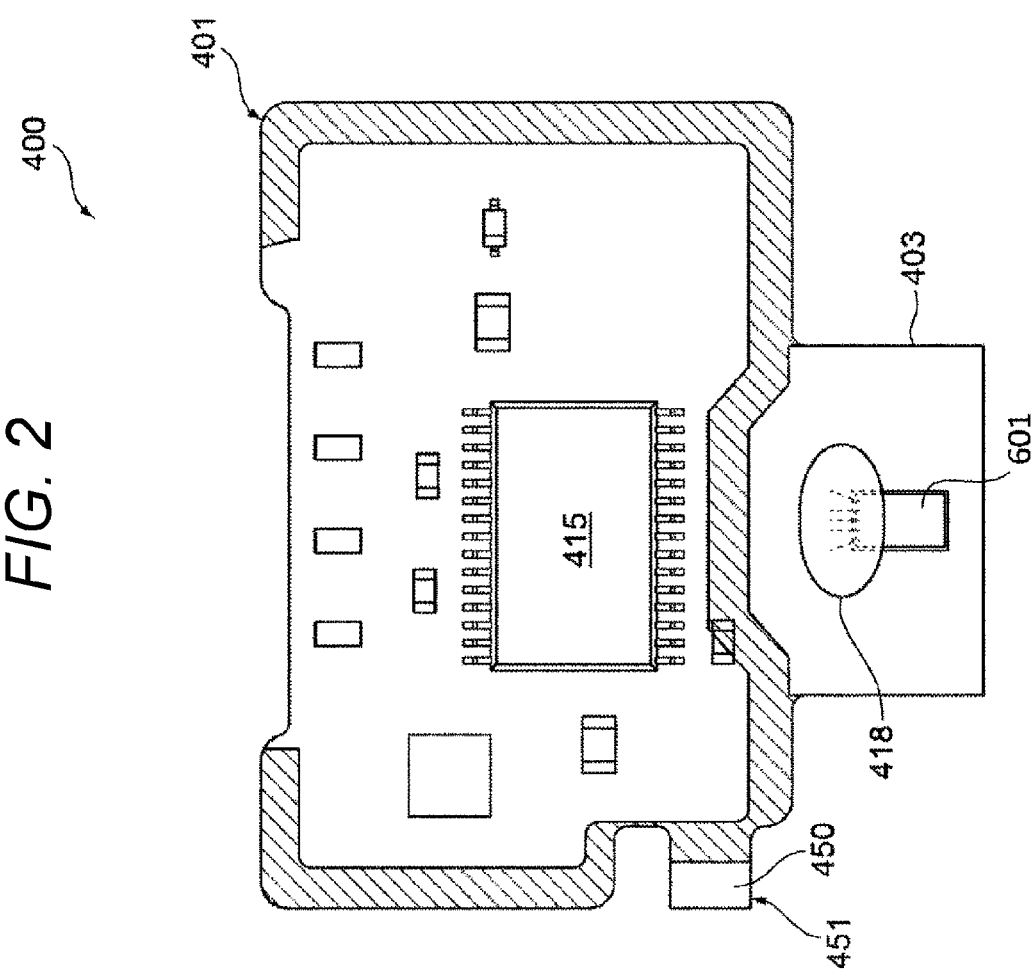
FIG. 2 is an enlarged view of the circuit board 400.

FIG. 2 is an enlarged view of the circuit board 400. The circuit board 400 includes a board main body 401, a first protrusion 403, and a second protrusion 450. A microcomputer 415 is mounted on the board main body 401, a flow rate detection circuit 601 covered with a synthetic resin material 418 is mounted on the first protrusion 403, and a temperature detecting unit 451 is mounted on the second protrusion 540. The microcomputer 415 is connected to the flow rate detection circuit 601 and the temperature detecting unit 451 by a signal line (not shown). The flow rate detection circuit 601 includes a heating element 608 described below, and measures the flow rate when the heating element 608 comes into contact with the fluid to be measured in a heating state. A pressure sensor 421 and a humidity sensor 422 being sensing elements are provided on the back surface of the board main body 401.

(Function Configuration)

Figure 3:
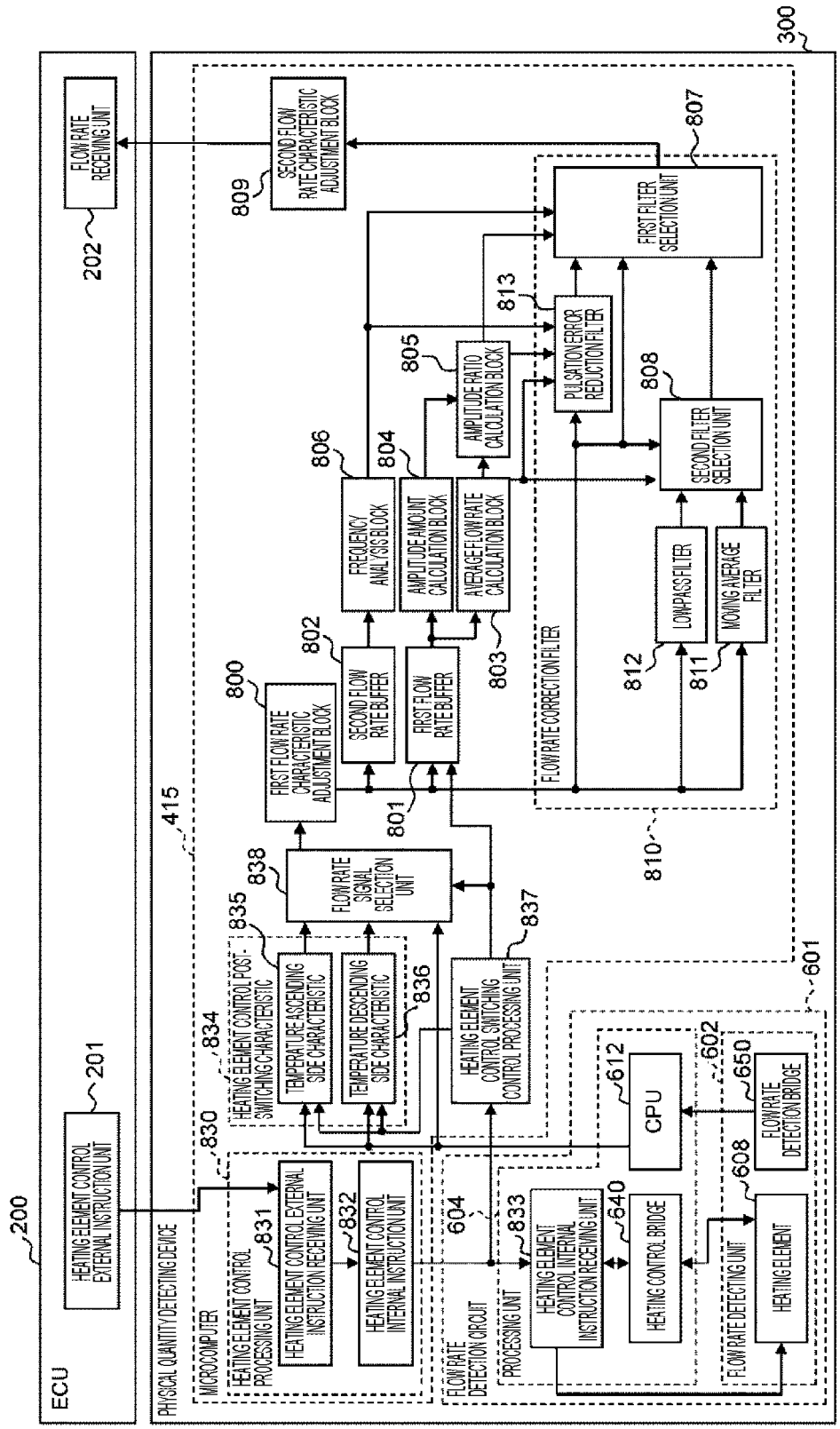
FIG. 3 is a diagram illustrating configurations of the ECU 200 and the physical quantity detecting device 300 according to a first embodiment.

FIG. 3 is a diagram showing a configuration of the ECU 200 and the physical quantity detecting device 300.

(ECU200)

The ECU 200 connected to the physical quantity detecting device 300 includes a heating element control external instruction unit 201 and a flow rate receiving unit 202. In the heating element control external instruction unit 201, the heating element control external instruction unit 201 is operated by a predetermined operation algorithm and the control state of the heating element 608 included in the physical quantity detecting device 300 is instructed. Specifically, the heating element 608 is controlled to a heating state or a heating suppression state. However, the physical quantity detecting device 300 outputs the measured value to the ECU 200 regardless of the control state of the heating element 608.

(Physical Quantity Detecting Device 300)

The physical quantity detecting device 300 includes a flow rate detection circuit 601 and a microcomputer 415 that processes an output value of the flow rate detection circuit 601. In the following, the function configurations of the flow rate detection circuit 601 and the microcomputer 415 will be described. Each function provided in the flow rate detection circuit 601 is achieved by a corresponding one piece of hardware or software as described below. Each function provided in the microcomputer 415 is achieved by a hardware circuit. However, the functions provided in the microcomputer 415 may be achieved by software processing.

(Flow Rate Detection Circuit 601)

The flow rate detection circuit 601 includes a processing unit 604 and a flow rate detecting unit 602.

The processing unit 604 includes a heating element control internal instruction receiving unit 833, a heating control bridge 640, and a CPU 612 being a central processing unit. The flow rate detecting unit 602 includes a heating element 608 and a flow rate detection bridge 650. The flow rate detection circuit 601 controls the heating element 608 according to the instruction of a heating element control internal instruction unit 832 described below provided in the microcomputer 415, and outputs the measured values to a temperature ascending side characteristic 835, a temperature descending side characteristic 836, and the flow rate signal selection unit 838. However, the output of the measured value is performed irrespective of the instruction content of the heating element control internal instruction unit 832.

The heating element control internal instruction receiving unit 833 of the processing unit 604 is hardware that communicates with a heating element control processing unit 830. The heating element control internal instruction receiving unit 833 causes the heating control bridge 640 to control the heating element 608 according to the instruction of the heating element control internal instruction unit 832. Specifically, the heating element control internal instruction unit 832 instructs switching between the heating state and the heating suppression state in the control state. When instructed to switch to the heating state from the heating element control internal instruction unit 832, the heating element control internal instruction receiving unit 833 causes the heating control bridge 640 to control the heating value of the heating element 608 so that the temperature of the gas to be measured is higher than the initial temperature by a predetermined temperature, for example, 100° C. This control is referred to as control of "heating state".

When instructed to switch to the heating suppression state from the heating element control internal instruction unit 832, the heating element control internal instruction receiving unit 833 performs control to prevent the heating control bridge 640 from heating the heating element 608. This control is referred to as control of "heating suppression state". In addition, the heating element control internal instruction receiving unit 833 controls power supply to the heating element 608 according to the instruction of the heating element control internal instruction unit 832. Specifically, the heating element control internal instruction receiving unit 833 supplies power to the heating element 608 when the heating state is instructed, and shuts off the power supply to the heating element 608 when the heating suppression state is instructed.

The heating control bridge 640 of the processing unit 604 is a bridge circuit including four resistance temperature detectors. The heating control bridge 640 is heated by the heating element 608 via the gas to be measured, and the resistance value changes. When the heating state is instructed, the CPU 612 monitors the resistance value of the heating control bridge 640, and controls the heating value of the heating element 608 so that the temperature of the gas to be measured becomes higher than the initial temperature by a predetermined temperature, for example, 100° C. When the heating suppression state is instructed, the CPU 612 controls the heating value of the heating element 608 so that the heating element 608 does not generate heat. The CPU 612 achieves the above-described functions by expanding a program stored in a ROM (not shown) into a RAM (not shown) and executing the program. However, when the heating suppression state is instructed, the CPU 612 does not need to perform any control.

The flow rate detection bridge 650 of the flow rate detecting unit 602 is a bridge circuit including four resistance temperature detectors. These four resistance temperature detectors are arranged along the flow of the gas to be measured. More specifically, two resistance temperature detectors are arranged on the upstream side of the heating element 608 in the flow path of the gas to be measured, and the other two are arranged on the downstream side of the heating element 608 in the flow path of the gas to be measured. Therefore, the flow of the gas to be measured causes the resistance temperature detector installed on the upstream side of the heating element 608 to be cooled and the resistance temperature detector installed on the downstream side of the heating element 608 to be heated by the gas to be measured heated by the heating element 608. The flow rate detection bridge 650 outputs a difference between the temperatures of these resistance temperature detectors as a potential difference.

(Microcomputer 415)

The microcomputer 415 includes a heating element control processing unit 830, a heating element control post-switching characteristic 834, a heating element control switching control processing unit 837, a flow signal selection unit 838, a first flow rate characteristic adjustment block 800, a first flow rate buffer 801, a second flow rate buffer 802, an average flow rate calculation block 803, an amplitude amount calculation block 804, an amplitude ratio calculation block 805, a frequency analysis block 806, a second flow rate characteristic adjustment block 809, and a flow rate correction filter 810.

(Microcomputer|Heating Element Control Processing Unit 830)

The heating element control processing unit 830 includes a heating element control external instruction receiving unit 831 that receives an instruction from the heating element control external instruction unit 201 included in the ECU 200, and a heating element control internal instruction unit 832. The heating element control internal instruction unit 832 instructs the heating element control internal instruction receiving unit 833 to change the control state of the heating element 608 according to the instruction of the heating element control external instruction unit 201 transmitted via the heating element control external instruction receiving unit 831.

(Microcomputer|Heating Element Control Post-Switching Characteristic 834)

The heating element control post-switching characteristic 834 includes a temperature ascending side characteristic 835 and a temperature descending side characteristic 836. The heating element control post-switching characteristic 834 performs processing when the heating element control switching control processing unit 837 detects a change from the heating suppression state to the heating state, or from the heating state to the heating suppression state. When a change from the heating suppression state to the heating state is detected, the heating element control post-switching characteristic 834 refers to the temperature ascending side characteristic 835, and outputs the detected flow rate when the heating state is stabilized based on the detected flow rate in the heating suppression state. When a change from the heating state to the heating suppression state is detected, the heating element control post-switching characteristic 834 refers to the temperature descending side characteristic 836, and outputs the detected flow rate when the heating suppression state is stabilized based on the detected flow rate in the heating state. It should be noted that the above-described "when stabilized" can be rephrased as "after settling". "Settling" will be described below.

FIG. 4 is a diagram illustrating the temperature ascending side characteristic 835, and FIG. 5 is a diagram illustrating the temperature descending side characteristic 836. As shown in FIGS. 4 and 5, both the temperature ascending side characteristic 835 and the temperature descending side characteristic 836 are information indicating the correspondence between the detected flow rate before switching of the control state and the detected flow rate after settling. FIGS. 4 and 5 show these correspondences in the form of a table, but the expression method is not limited to this, and may be expressed by, for example, an approximate expression representing the relationship between the two. In addition, in FIGS. 4 and 5, the temperature before switching is described in increments of 10 degrees, but the temperature may be recorded in smaller increments of temperature, or may be complemented by proportional complement or the like.

(Microcomputer|Heating Element Control Switching Control Processing Unit 837)

The heating element control switching control processing unit 837 monitors an instruction of the heating element control internal instruction unit 832 and detects a change from the heating suppression state to the heating state and a change from the heating state to the heating suppression state. Next, the heating element control switching control processing unit 837 determines which of the following first to third states the current state corresponds to. Then, the heating element control switching control processing unit 837 transmits the determined state to the heating element control post-switching characteristic 834, the flow rate signal selection unit 838, and the first flow rate buffer 801.

The first state is a state within a predetermined period Tres immediately after a change from the heating suppression state to the heating state is detected. The second state is a state within a predetermined period Tres immediately after a change from the heating state to the heating suppression state is detected. The third state is another state, in other words, a state in which a predetermined period Tres or more has elapsed since a change from the heating suppression state to the heating state is detected, and a predetermined period Tres or more has elapsed since a change from the heating state to the heating suppression state is detected. The predetermined period Tres is a period obtained from the temperature response of the heating element 608 and the flow rate detection bridge 650, and is calculated by an experiment performed in advance and the information is stored in the microcomputer 415.

(Microcomputer|Flow Rate Signal Selection Unit 838)

The flow rate signal selection unit 838 selects and outputs any one of the three signals according to the determination of the heating element control switching control processing unit 837. The flow rate signal selection unit 838 selects a flow rate value obtained from the temperature ascending side characteristic 835 for a predetermined period Tres immediately after a change from the heating suppression state being the first state to the heating state is instructed. The flow rate signal selection unit 838 selects a flow rate value obtained from the temperature descending side characteristic 836 for a predetermined period Tres immediately after a change from the heating state being the second state to the heating suppression state is instructed. In the third state, the flow rate signal selection unit 838 selects the detected flow rate, that is, the output of the flow rate detection circuit 601. It should be noted that hereinafter, the output of the flow rate signal selection unit 838 is also referred to as an "estimated value".

(Microcomputer|First Flow Rate Characteristic Adjustment Block 800)

The first flow rate characteristic adjustment block 800 gives a desired characteristic to the flow rate signal selected by the flow rate signal selection unit 838. The first flow rate characteristic adjustment block 800 outputs a flow rate value that gives the characteristic to the first flow rate buffer 801, the second flow rate buffer 802, the first filter selection unit 807, the moving average filter 811, the low-pass filter 812, and the pulsation error reduction filter 813.

Figure 6:
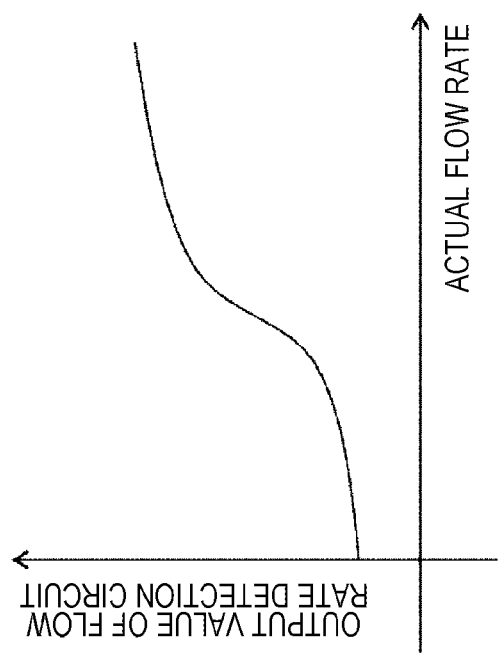
FIG. 6 is a diagram illustrating output characteristics of the flow rate detection circuit 601.
Figure 7:
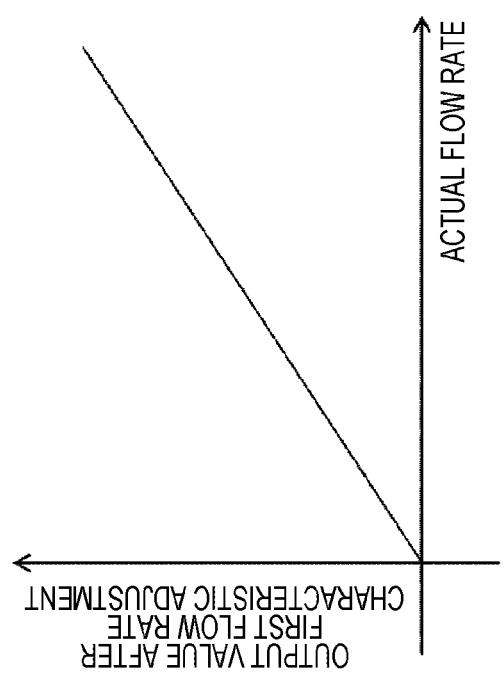
FIG. 7 is a diagram illustrating output characteristics of the first flow rate characteristic adjustment block 800.

FIGS. 6 and 7 are diagrams illustrating the operation of the first flow rate characteristic adjustment block 800. FIG. 6 is a diagram illustrating the output characteristics of the flow rate detection circuit 601, and FIG. 7 is a diagram illustrating the output characteristics of the first flow rate characteristic adjustment block 800. As shown in FIG. 6, the output of the flow rate detection circuit 601 tends to increase monotonically with the increase in the actual flow rate, but the increase in the output of the flow rate detection circuit 601 is not necessarily constant with respect to the increase in the actual flow rate, and the processing in the microcomputer 415 is hindered. Therefore, the first flow rate characteristic adjustment block 800 gives a desired characteristic to the flow rate signal selected by the flow rate signal selection unit 838 so as to have the characteristics shown in FIG. 7.

(Microcomputer|First Flow Rate Buffer 801)

The first flow rate buffer 801 temporarily stores the output value of first flow rate characteristic adjustment block 800. The first flow rate buffer 801 holds the flow rate value converted by the first flow rate characteristic adjustment block 800 for at least the pulsation period of the flow rate from the latest output. It should be noted that the pulsation period of the flow rate is obtained by a calculation of a frequency analysis block 806 described below. When the heating element control switching control processing unit 837 detects a change from the heating suppression state to the heating state or from the heating state to the heating suppression state, the first flow rate buffer 801 discards the held content and newly starts the accumulation.

(Microcomputer|Second Flow Rate Buffer 802)

The second flow rate buffer 802 temporarily stores the output values of the first flow rate characteristic adjustment block 800 at least as many as those of the first flow rate buffer 801. The second flow rate buffer 802 deletes old output values when the number of stored output values exceeds a predetermined number.

(Microcomputer|Average Flow Rate Calculation Block 803)

The average flow rate calculation block 803 refers to the first flow rate buffer 801 and calculates the average value of the output values of the first flow rate characteristic adjustment block 800. The average flow rate calculation block 803 outputs a calculation result to the amplitude ratio calculation block 805, the second filter selection unit 808, and the pulsation error reduction filter 813.

(Microcomputer|Amplitude Amount Calculation Block 804)

The amplitude amount calculation block 804 calculates the difference between the maximum value of the flow rate value stored in the first flow rate buffer 801 and the minimum value of the flow rate value stored in the first flow rate buffer 801 as the amplitude amount. The amplitude amount calculation block 804 outputs a calculation result to the amplitude ratio calculation block 805.

(Microcomputer|Amplitude Ratio Calculation Block 805)

The amplitude ratio calculation block 805 calculates the amplitude ratio by dividing the amplitude amount calculated by the amplitude amount calculation block 804 by the flow rate average value calculated by the average flow rate calculation block 803. The amplitude ratio calculation block 805 outputs the calculation result to the first filter selection unit 807 and the pulsation error reduction filter 813.

(Microcomputer|Frequency Analysis Block 806)

The frequency analysis block 806 obtains a spectrum for each analysis frequency by performing a discrete Fourier transform on the flow rate value stored in the second flow rate buffer 802. It should be noted that the analysis frequency is determined based on the characteristics of the fluid to be measured being a measurement target of the physical quantity detecting device 300 being already known. For example, when the fluid to be measured is the exhaust of the engine, the measurement frequency is calculated from the number of cylinders of the engine and the range of the rotational speed of the engine. In addition, the obtained power spectrum density for each analysis frequency is referred to, the dominant frequency, that is, the frequency having the maximum power spectrum density is set as the pulsation frequency of the gas to be measured. The reciprocal of the pulsation frequency is the pulsation period that determines the number of flow rate values temporarily recorded by the first flow rate buffer 801. The frequency analysis block 806 outputs the pulsation frequency to the first filter selection unit 807.

(Microcomputer|Second Flow Rate Characteristic Adjustment Block 809)

The second flow rate characteristic adjustment block 809 gives a desired characteristic to the output value after the flow rate correction filter in order to facilitate the calculation using the output of the physical quantity detecting device 300 in a later step. That is, the calculation of the second flow rate characteristic adjustment block 809 gives a characteristic according to the ECU 200 on which the post-processing is executed.

(Microcomputer|Flow Rate Correction Filter 810)

The flow rate correction filter 810 includes a moving average filter 811, a low-pass filter 812, a first filter selection unit 807, a second filter selection unit 808, and a pulsation error reduction filter 813. The moving average filter 811 calculates a moving average with a predetermined sampling number on the output of the first flow rate characteristic adjustment block 800 as a processing target, and outputs the moving average to the second filter selection unit 808. The low-pass filter 812 applies a predetermined low-pass filter to the output of the first flow rate characteristic adjustment block 800 as a processing target, and outputs the output to the second filter selection unit 808.

The first filter selection unit 807 compares the amplitude ratio calculated by the amplitude ratio calculation block 805 with an amplitude ratio threshold value 807*a*, and compares the pulsation frequency calculated by the frequency analysis block 806 with a frequency threshold value 807*b*. Based on these comparisons, the first filter selection unit 807 outputs the output of any one of the first flow rate characteristic adjustment block 800, the second filter selection unit 808, and the pulsation error reduction filter 813 to the second flow rate characteristic adjustment block 809. To make sure, the first filter selection unit 807 may output the output of the first flow rate characteristic adjustment block 800 to the second flow rate characteristic adjustment block 809 as it stands without any filter.

When the amplitude ratio calculated by the amplitude ratio calculation block 805 is larger than the amplitude ratio threshold value 807*a* and the pulsation frequency calculated by the frequency analysis block 806 is larger than the frequency threshold value 807*b*, the first filter selection unit 807 selects the output of the pulsation error reduction filter 813. When the amplitude ratio calculated by the amplitude ratio calculation block 805 is equal to or less than the amplitude ratio threshold value 807*a* and the flow rate average value calculated by the average flow rate calculation block 803 is equal to or less than the frequency threshold value 807*b*, the first filter selection unit 807 selects the output of the second filter selection unit 808. When the amplitude ratio calculated by the amplitude ratio calculation block 805 is larger than the amplitude ratio threshold value 807*a*, and the pulsation frequency calculated by the frequency analysis block 806 is equal to or less than the frequency threshold value 807*b*, and when the amplitude ratio calculated by the amplitude ratio calculation block 805 is equal to or less than the amplitude ratio threshold value 807a, and the flow rate average value calculated by the average flow rate calculation block 803 is larger than the frequency threshold value 807b, the first filter selection unit 807 does not perform filtering. That is, in this case, the output of the first flow rate characteristic adjustment block 800 is output to the second flow rate characteristic adjustment block 809 as it stands.

The second filter selection unit 808 compares the flow rate average value calculated by the average flow rate calculation block 803 with a flow rate threshold value 808a. When the flow rate average value calculated by the average flow rate calculation block 803 is larger than the flow rate threshold value 808a, the second filter selection unit 808 outputs the output of the low-pass filter 812 to the first filter selection unit 807. When the flow rate average value calculated by the average flow rate calculation block 803 is equal to or less than the flow rate threshold value 808a, the second filter selection unit 808 outputs the output of the moving average filter 811 to the first filter selection unit 807.

Figure 8:
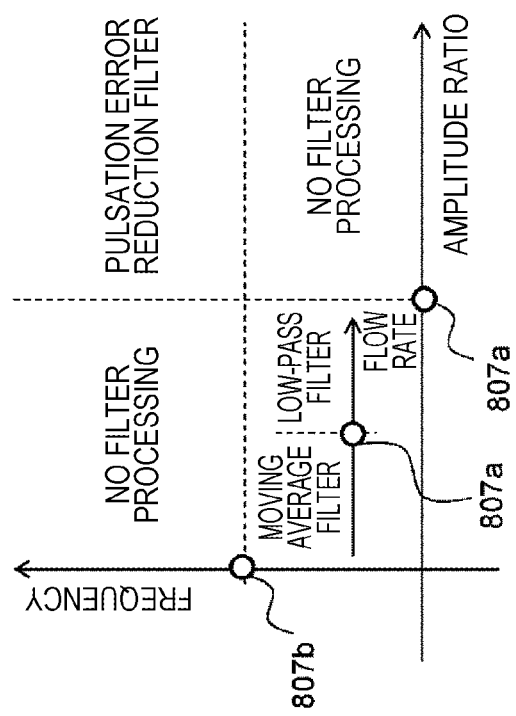
FIG. 8 is a diagram illustrating selection of the first filter selection unit 807 and the second filter selection unit 808.

FIG. 8 is a diagram illustrating selection of the first filter selection unit 807 and the second filter selection unit 808. In FIG. 8, the region is largely divided into four, and the lower left region is further divided into two. The first filter selection unit 807 determines which of the four large regions is to be selected, and the second filter selection unit 808 determines which of the two is to be selected in the lower left region. Thus, the two filter selection units evaluate the magnitude relationship between the amplitude ratio calculated by the amplitude ratio calculation block 805 and the amplitude ratio threshold value 807a, the magnitude relationship between the pulsation frequency calculated by the frequency analysis block 806 and the frequency threshold value 807b, and the magnitude relationship between the flow rate average value calculated by the average flow rate calculation block 803 and the flow rate threshold value 808a.

(Pulsation Error Reduction Filter 813)

The pulsation error reduction filter 813 uses the outputs of the average flow rate calculation block 803, the amplitude ratio calculation block 805, and the frequency analysis block 806 to calculate a measured value obtained by reducing the effect of pulsation from the output of the first flow rate characteristic adjustment block 800, and outputs the measured value to the first filter selection unit 807. Specifically, the pulsation error reduction filter 813 outputs a signal obtained by adding a frequency characteristic correction flow rate and a flow rate dependence correction flow rate described below to the output of the first flow rate characteristic adjustment block 800.

The frequency characteristic correction flow rate is a product of the frequency characteristic gain and the output of the average flow rate calculation block 803. The frequency characteristic gain is determined based on the output of the amplitude ratio calculation block 805 and the output of the frequency analysis block 806 with reference to a predetermined first table. In the first table, for example, the output of the amplitude ratio calculation block 805 is described on the horizontal axis, and the output of the frequency analysis block 806 is described on the vertical axis. Any interpolation calculation such as proportional interpolation is performed as necessary.

The flow rate dependence correction flow rate is the product of the increase or decrease amount of the flow rate dependence correction gain and the frequency characteristic correction flow rate. The flow rate dependence correction gain is determined based on the frequency characteristic correction flow rate and the output of the amplitude ratio calculation block 805 with reference to a predetermined second table. In the second table, for example, the frequency characteristic correction flow rate is described on the horizontal axis, and the output of the amplitude ratio calculation block 805 is described on the vertical axis.

Any interpolation calculation such as proportional interpolation is performed as necessary. It should be noted that the "increase or decrease amount" of the flow rate dependence correction gain is a difference from 1, for example, when the flow rate dependence correction gain is "1.5", the increase or decrease amount of the flow rate dependence correction gain is "0.5".

(Operation Example)

The physical quantity detecting device 300 detects the intake air amount of the internal combustion engine. However, in a vehicle mounting a start-stop function, a hybrid vehicle, or the like, the internal combustion engine may be stopped, and there is a period during which no intake air exists. When the operation of the internal combustion engine is stopped, there is a possibility that the flow rate detection bridge 650 may be contaminated by the unburned gas reaching the physical quantity detecting device 300 from the internal combustion engine side. In addition, in a hybrid vehicle or the like, it is conceivable to suppress heating of the heating element 608 in order to prevent waste of power consumption accompanying heating of the heating element 608 in a state where there is no intake air obviously. When operation of the internal combustion engine is resumed, a problem may occur if the output of the flow rate detection circuit 601 is used as it is, but the physical quantity detecting device 300 solves this problem.

Figure 9:
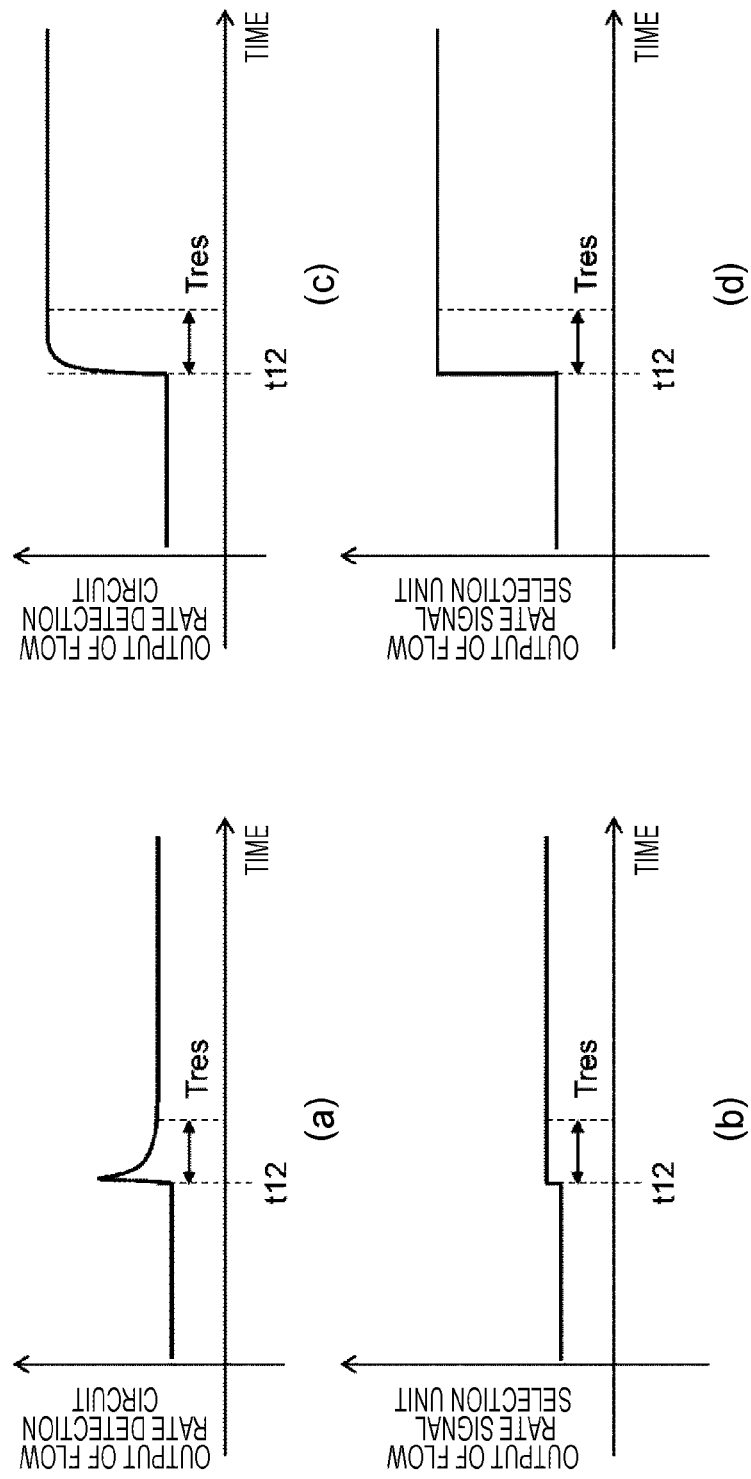
FIG. 9 is a diagram illustrating an output of the flow rate signal selection unit 838.

FIG. 9 is a diagram illustrating an operation example of the physical quantity detecting device 300, specifically, an output of the flow rate signal selection unit 838 of the physical quantity detecting device 300. However, in order to illustrate the effect of the physical quantity detecting device 300, the output of the flow rate detection circuit 601 is also shown.

In FIG. 9, the horizontal axis represents time, and the vertical axis represents the output of the flow rate signal selection unit 838. In FIG. 9, time t12 indicates the timing at which the heating state is switched to the heating suppression state. In addition, in FIGS. 9(a) and 9(b), the actual flow rate of the fluid to be measured is always zero in the range shown in the graph, and in FIGS. 9(c) and 9(d), the actual flow rate of the fluid to be measured is a constant value in the range shown in the graph.

FIGS. 9(a) and 9(c) show the output of the flow rate detection circuit 601 and FIGS. 9(b) and 9(d) show the output of the flow rate signal selection unit 838. That is, the signal shown in FIG. 9(a) is input from the flow rate detection circuit 601 to the microcomputer 415, and the signal shown in FIG. 9(b) is output by the processing of the heating element control post-switching characteristic 834, the heating element control switching control processing unit 837, and the flow rate signal selection unit 838. The same applies to the relationship between FIG. 9(c) and FIG. 9(d).

As shown in FIG. 9(a), in a state where the actual flow rate of the fluid to be measured is zero, when the control state of the heating element 608 is switched from the heating suppression state to the heating state, the flow rate measured value greatly increases at the switching time t12, and thereafter, gradually decreases and settles to a steady value. The period from time t12 until the flow rate measured value is settled is Tres, and this period represents the temperature response of the heating element 608 and the flow rate detection bridge 650. It should be noted that settling means, for example, reaching a range of plus or minus 2% of a steady value. Then, as shown in FIG. 9(b), the output of the flow rate signal selection unit 838 switches instantaneously at time t12, and there is no transitional change in the output as shown in FIG. 9(a). This is because the flow rate signal selection unit 838 adopts the output of the heating element control post-switching characteristic 834 for the period Tres from time t12, and the heating element control post-switching characteristic 834 determines the output based on the value immediately before time t12.

In addition, as shown in FIGS. 9(c) and 9(d), the same effect can be confirmed when the flow rate of the fluid to be measured takes a constant value. That is, the output of the flow rate detection circuit 601 gradually increases from time t12 as shown in FIG. 9(c), and the output of the flow rate signal selection unit 838 is instantaneously switched at time t12 as shown in FIG. 9(d).

Figure 10:
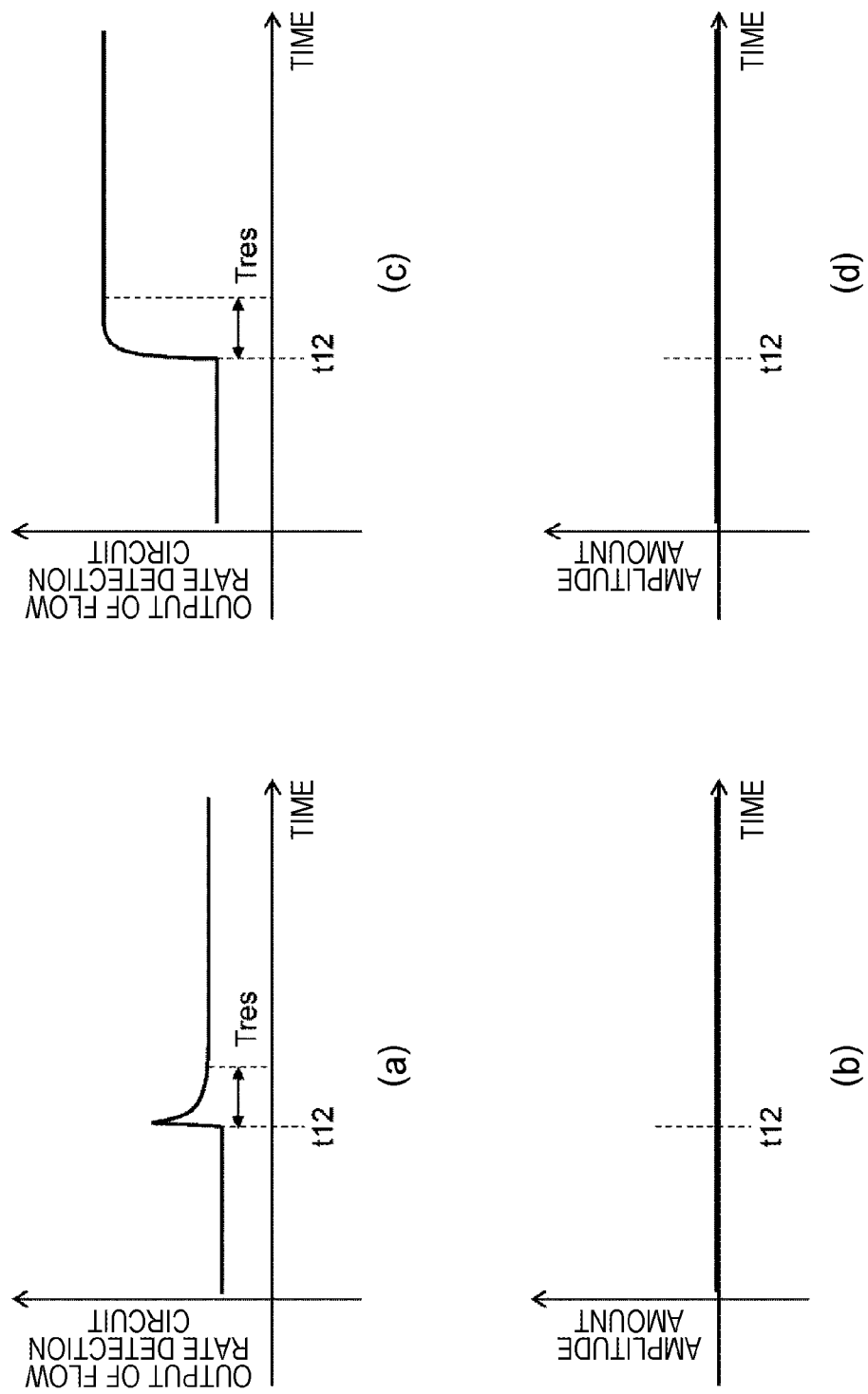
FIG. 10 is a diagram illustrating an output of the amplitude amount calculation block 804.

FIG. 10 is a diagram illustrating the amplitude amount in the same situation as in FIG. 9, that is, the output of the amplitude amount calculation block 804. However, the output of the flow rate detection circuit 601 is also shown for comparison. FIGS. 10(a) and 10(c) are the same as FIGS. 9(a) and 9(c). FIG. 10(b) is a diagram illustrating an output of the amplitude amount calculation block 804 in the same time series as in FIG. 10(a). FIG. 10(d) is a diagram illustrating an output of the amplitude amount calculation block 804 in the same time series as in FIG. 10(c).

FIGS. 10(b) and 10(d) are always zero, and it can be seen that the values are calculated according to the actual situation.

Comparative Example

Figure 11:
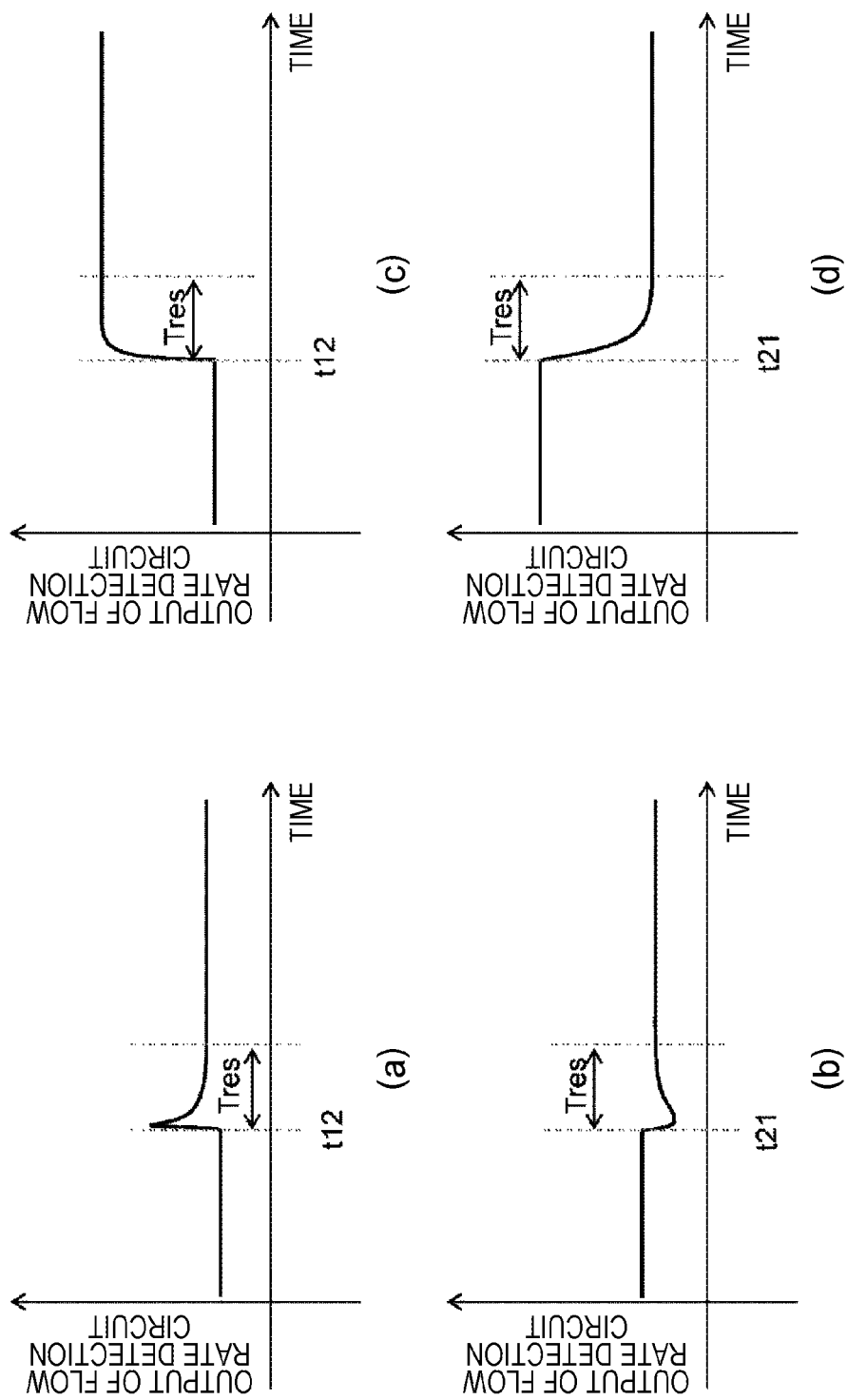
FIG. 11 is a diagram illustrating an output of the flow rate detection circuit 601.

FIG. 11 is a diagram illustrating an output of the flow rate detection circuit 601. In FIG. 11, the horizontal axis represents time, and the vertical axis represents the flow rate measured value being the output of the flow rate detection circuit 601. In FIG. 11, time t12 indicates the timing of switching from the heating state to the heating suppression state, and t21 indicates the timing of switching from the heating suppression state to the heating state. In addition, in FIGS. 11(a) and 11(b), the flow rate of the fluid to be measured is always zero in the range shown in the graph, and in FIGS. 11(c) and 11(d), the flow rate of the fluid to be measured is a constant value in the range shown in the graph.

As shown in FIG. 11(a), in a state where the flow rate of the fluid to be measured is zero, when the heating element 608 is switched from the heating suppression state to the heating state, the flow rate measured value greatly increases at the switching time t12, and thereafter, gradually settles to a steady value. The period from time t12 until the flow rate measured value is settled is Tres, and this period represents the temperature response of the heating element 608 and the flow rate detection bridge 650. It should be noted that settling means, for example, reaching a range of plus or minus 2% of a steady value. Any one of FIGS. 11(b) to 11(d) shows a transient state as in FIG. 17(a). It should be noted that the time Tres until settling does not always match in each of FIGS. 11(a) to 11(d), but in that case, the longest time is set as Tres.

Figure 12:
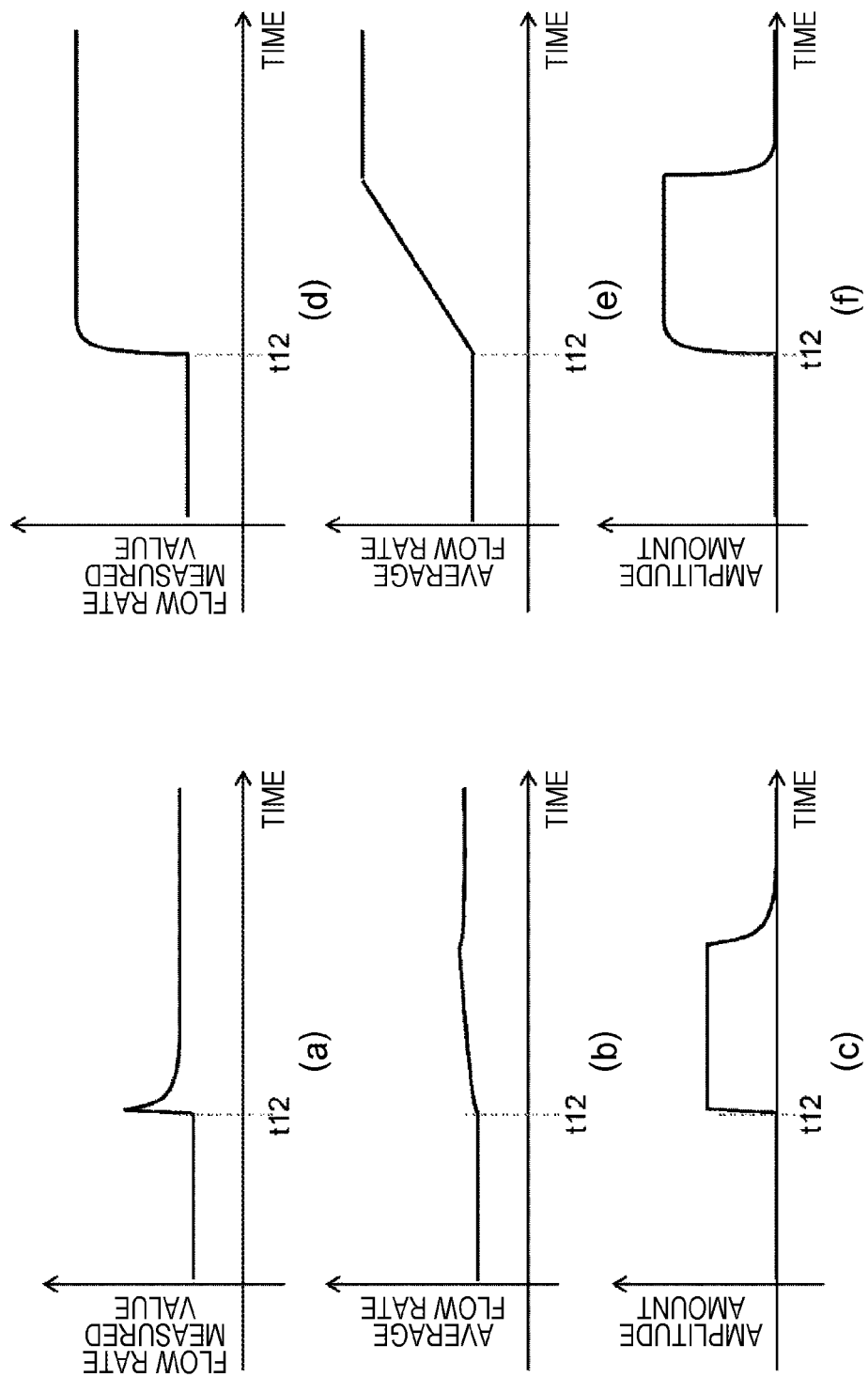
FIG. 12 is a diagram illustrating a time-series change in the average flow rate and the amplitude amount.

FIG. 12 is a diagram illustrating a time-series change in the average flow rate and the amplitude amount. However, the flow rate measured value is also shown for comparison. Each of FIGS. 12(a) to 12(c) is a diagram illustrating the flow rate measured value, the average flow rate, and the amplitude amount when the heating element 608 is switched from the heating suppression state to the heating state in a state where the flow rate of the fluid to be measured is zero. Each of FIGS. 12(d) to 12(f) is a diagram illustrating the flow rate measured value, the average flow rate, and the amplitude amount when the heating element 608 is switched from the heating suppression state to the heating state in a state where the flow rate of the fluid to be measured is a constant value. That is, FIG. 12(a) and FIG. 11(a) are the same, and FIG. 12(d) and FIG. 11(c) are the same.

FIGS. 12(b) and 12(e) can be said to be the results of the average flow rate calculation block 803 processing the flow rate measured values. FIGS. 12(c) and 12(f) can be said to be the results of the amplitude amount calculation block 804 processing the flow rate measured values. As shown in FIG. 12, when the flow rate measured value itself is evaluated, it can be seen that in the transient state, the average flow rate and the amplitude amount are also calculated with values deviating from actual situation.

According to the above-described first embodiment, the following action and effect can be obtained.

(1) The physical quantity detecting device 300 includes a flow rate detecting unit 602 including a heating element 608 to measure the flow rate of the fluid to be measured, a heating element control internal instruction receiving unit 833, a heating control bridge 640, and a CPU 612 that switch a control state of the heating element 608 to a heating state and a heating suppression state, and a microcomputer 415 that processes the measured value of the flow rate detecting unit 602. When the control state of the heating element 608 is switched, the flow rate signal selection unit 838 of the microcomputer 415 outputs an estimated value determined based on the measured value of the flow rate detecting unit 602 before switching for a predetermined period immediately after the switching. Since the flow rate signal selection unit 838 outputs the output of the heating element control post-switching characteristic 834 rather than the output of the flow rate detecting unit 602 itself being the measured value according to the switching of the control state of the heating element 608 as shown in FIGS. 9(b) and 9(d), it is possible to reduce a decrease in measurement accuracy after switching the control state of the heating element 608, that is, the overheating state of the heating element 608.

(2) The microcomputer 415 includes a first flow rate buffer 801 that temporarily records estimated values for a predetermined period in the past, an average flow rate calculation block 803 that calculates an average flow rate being an average of the estimated values with reference to the first flow rate buffer 801, an amplitude amount calculation block 804 that calculates an amplitude amount being the amplitude of the estimated value with reference to the first flow rate buffer 801, and an amplitude ratio calculation block 805 that calculates an amplitude ratio using the calculation results of the average flow rate calculation block 803 and the amplitude amount calculation block 804. The microcomputer 415 further includes a frequency analysis block 806 that performs frequency analysis of the estimated value and calculates a dominant frequency in the estimated value, and a pulsation error reduction filter 813 that outputs an estimated value in which the effect of pulsation in the estimated value is reduced using the output of the average flow rate calculation block 803, the output of the amplitude amount calculation block 804, the output of the amplitude ratio calculation block 805, and the output of the frequency analysis block 806. Therefore, using the pulsation error reduction filter 813 allows the effect of the pulsation included in the measured value to be reduced.

(3) The microcomputer 415 includes a second filter selection unit 808 that outputs a moving average value of the estimated value, or a value obtained by applying a low-pass filter to the estimated value based on the magnitude relationship between the output of the average flow rate calculation block 803 and the flow rate threshold value 808a, and a first filter selection unit 807 that outputs any one of the estimated value, the output of the pulsation error reduction filter 813, and the output of the second filter selection unit 808 based on the magnitude relationship between the output of the amplitude ratio calculation block 805 and the amplitude ratio threshold value 807a and the magnitude relationship between the output of the frequency analysis block 806 and the frequency threshold value 807b.

Therefore, in a high frequency state in which a pulsation error due to the response characteristic of the flow rate detection circuit 601 tends to be large, and in a state where the signal output by the processing unit 604 changes dynamically, it is possible to correct the response delay. In addition, in a low frequency state where the pulsation error due to the response characteristic of the flow rate detection circuit 601 is small and the signal itself output by the processing unit 604 is small, a relatively large noise component can be controlled according to the magnitude of the signal itself. In addition, in a high frequency state where the pulsation error due to the response characteristic of the flow rate detection circuit 601 is likely to be large but in a state where the change in the signal output by the processing unit 604 is small, and in a low frequency state where the pulsation error due to the response characteristic of the flow rate detection circuit 601 is small but in a state where the change in the signal output by the processing unit 604 is large, since the response can be made with the response characteristic of the flow rate detection circuit 601, it is possible that the filtering processing is not applied.

(4) When the control state of the heating element 608 is switched, the microcomputer 415 deletes the estimated value recorded in the first flow rate buffer 801. Therefore, as shown in FIGS. 10(b) and 10(d), it is possible to calculate the amplitude amount according to the actual situation. If the heating element 608 does not delete the estimated value recorded in the first flow rate buffer 801 even though the control state has been switched, there is a following problem. That is, if the measured value before the control state is switched remains in the first flow rate buffer 801, it is treated as if the measured value has changed even though the actual flow rate does not change, and the amplitude amount is no longer zero.

(5) The heating element control post-switching characteristic 834 of the microcomputer 415 includes a temperature ascending side characteristic 835 and a temperature descending side characteristic 836 indicating the correspondence between the heating state and the heating suppression state of the measured value at the time of settling in a state where the flow rate of the fluid to be measured is the same. The microcomputer 415 determines an estimated value based on the control state before the switching of the control state and the measured value before the switching of the control state with reference to the temperature ascending side characteristic 835 and the temperature descending side characteristic 836. Therefore, when the actual flow rate does not change before and after the control state of the heating element 608 is switched, the estimated value output by the flow rate signal selection unit 838 can be made to match the actual flow rate even when the control state of the heating element 608 is switched.

(6) The flow rate signal selection unit 838 of the microcomputer 415 sets the measured value as the estimated value after a predetermined period has elapsed since the switching of the control state of the heating element 608. Therefore, a change in the actual flow rate can be reflected in the output of the flow rate signal selection unit 838 after the elapse of the period Tres from the switching of the control state.

(7) The microcomputer 415 includes a heating element control external instruction receiving unit 831 that receives a signal for controlling the heating element 608 from outside. The heating element control internal instruction unit 832 changes the control state of the heating element 608 based on the operation command of the heating element control external instruction receiving unit 831. Therefore, it is possible to appropriately save power in accordance with an operation command of an apparatus using the output of the physical quantity detecting device 300. For example, when the ECU 200 using the output of the physical quantity detecting device 300 does not refer to the output of the physical quantity detecting device 300 for a certain period, the ECU 200 instructs the physical quantity detecting device 300 in the heating suppression state, whereby unnecessary heating of the heating element 608 can be avoided.

(Modification 1)

In the above-described first embodiment, the microcomputer 415 includes the second filter selection unit 808 that selects any one of the moving average filter 811 and the low-pass filter 812. However, the microcomputer 415 may include only one of the moving average filter 811 and the low-pass filter 812. In this case, even the second filter selection unit 808 does not need to be included.

(Modification 2)

In the above-described first embodiment, the physical quantity detecting device 300 measures the flow rate, the temperature, the pressure, and the humidity. However, the physical quantity detecting device 300 only needs to measure at least the flow rate, and does not need to measure at least one of the other four physical quantities.

Second Embodiment

A second embodiment of the physical quantity detecting device will be described with reference to FIG. 13. In the following description, the same components as those in the first embodiment are denoted by the same reference numerals, and differences will be mainly described. The points not particularly described are the same as those in the first embodiment. The present embodiment is different from the first embodiment mainly in that the information stored in the first flow rate buffer based on the output of the heating element control internal instruction unit 832 is not deleted.

Figure 13:
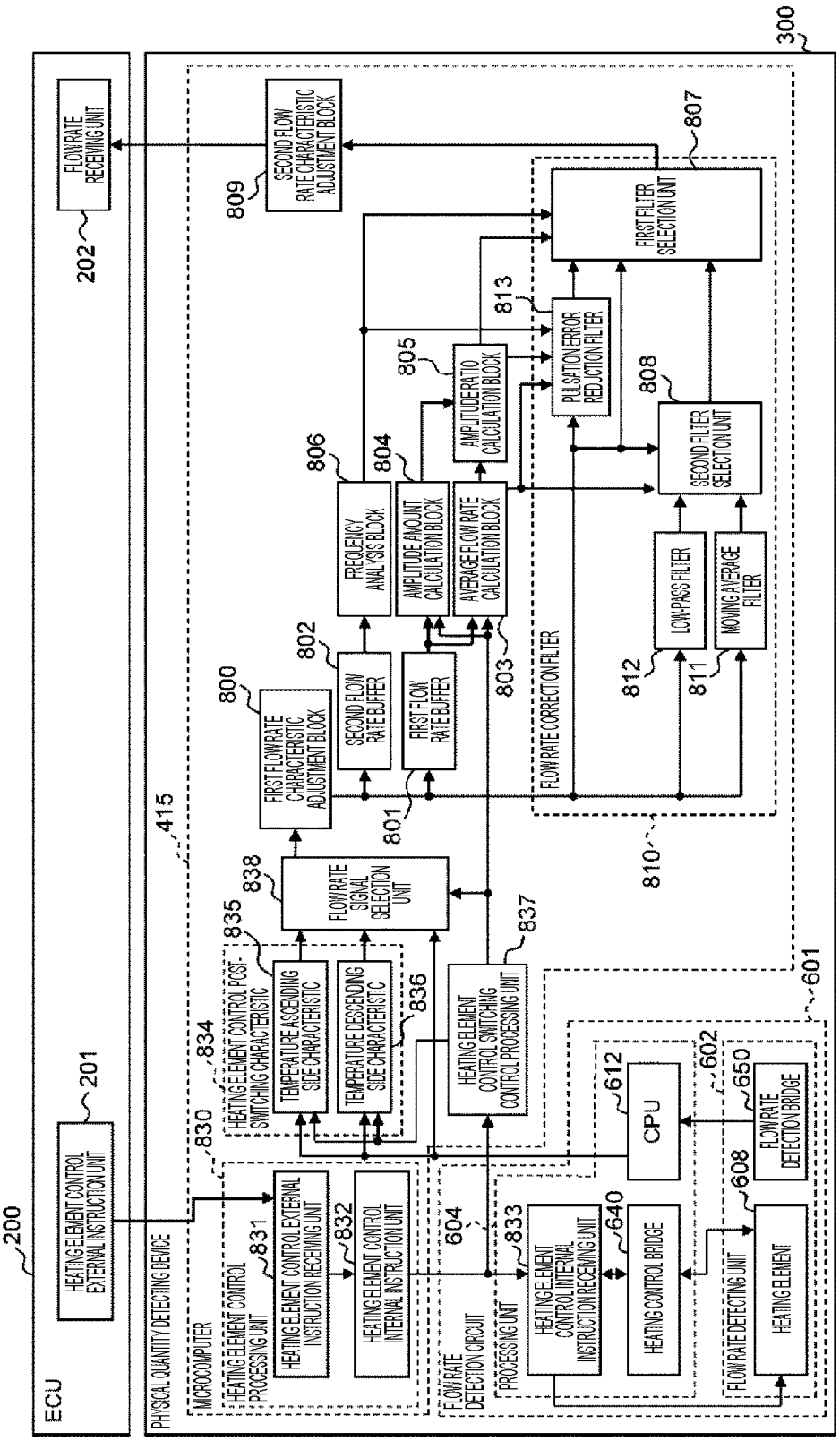
FIG. 13 is a diagram illustrating configurations of the ECU 200 and the physical quantity detecting device 300 according to a second embodiment.

FIG. 13 is a diagram illustrating a configuration of a physical quantity detecting device 300 according to the second embodiment. The hardware configuration and the function configuration of the physical quantity detecting device 300 in the present embodiment are the same as those of the first embodiment, but the operations of the first flow rate buffer 801, the average flow rate calculation block 803, and the amplitude amount calculation block 804 are different from those of the first embodiment. In addition, the present embodiment is different from the first embodiment also in that one of the output destinations of the signal of the heating element control internal instruction unit 832 is changed from the first flow rate buffer 801 to the average flow rate calculation block 803.

The first flow rate buffer 801 in the present embodiment does not receive a signal from the heating element control internal instruction unit 832, and the deletion of the information stored in the first flow rate buffer based on the output of the heating element control internal instruction unit 832 as in the first embodiment is not performed. That is, the first flow rate buffer 801 in the present embodiment only deletes the oldest output value when there is a new output of the first flow rate characteristic adjustment block 800, and in other cases, the deletion is not performed.

The average flow rate calculation block 803 calculates the average value of the flow rate values stored in the first flow rate buffer 801 in principle. However, when the heating element control switching control processing unit 837 detects a change from the heating suppression state to the heating state or from the heating state to the heating suppression state, the average flow rate calculation block 803 calculates the average value with only the region where the flow rate value after the detection of the change is held as the reference range.

As in the first embodiment, the amplitude amount calculation block 804 calculates the difference between the maximum value of the flow rate value stored in the first flow rate buffer 801 and the minimum value of the flow rate value stored in the first flow rate buffer 801 as the amplitude amount. However, when the heating element control switching control processing unit 837 detects a change from the heating suppression state to the heating state or from the heating state to the heating suppression state, the amplitude amount calculation block 804 calculates the amplitude amount with only the region where the flow rate value after the detection of the change is held as the reference range.

According to the above-described second embodiment, the same action and effect as those of the first embodiment can be obtained.

Third Embodiment

A third embodiment of the physical quantity detecting device will be described with reference to FIGS. 14 to 15. In the following description, the same components as those in the first embodiment and the second embodiment are denoted by the same reference numerals, and differences will be mainly described. The points not particularly described are the same as those in the second embodiment. The present embodiment is different from the first embodiment mainly in that the heating element control processing unit 830 of the physical quantity detecting device 300 does not include the heating element control external instruction receiving unit 831. It should be noted that the operations of the first flow rate buffer 801 and the average flow rate calculation block 803 may be the same as those of the first embodiment.

Figure 14:
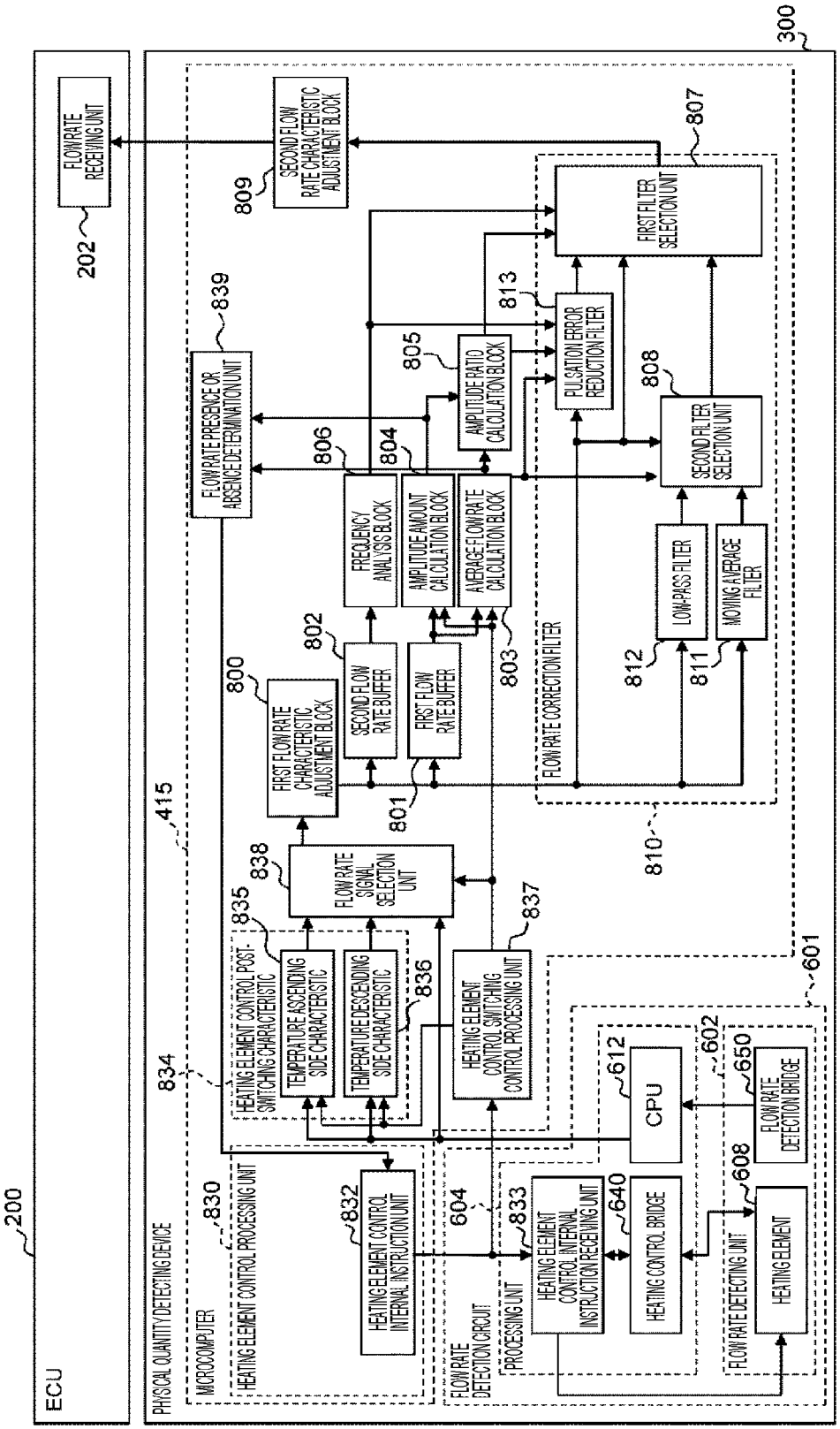
FIG. 14 is a diagram illustrating configurations of the ECU 200 and the physical quantity detecting device 300 according to a third embodiment.

FIG. 14 is a diagram illustrating a configuration of a physical quantity detecting device 300 according to the third embodiment. The hardware configuration of the physical quantity detecting device 300 according to the present embodiment is the same as that of the second embodiment. The function configuration of the physical quantity detecting device 300 according to the present embodiment differs from the second embodiment. The heating element control external instruction receiving unit 831 is deleted, a flow rate presence or absence determination unit 839 is added, and the operation of the heating element control internal instruction unit 832 is different.

The flow rate presence or absence determination unit 839 determines whether the flow rate detected in the flow rate detecting unit 602 is a value indicating zero, in other words, whether the actual flow rate is zero, by using the calculated value of the average flow rate calculation block 803 and the calculated value of the amplitude amount calculation block 804. Then, the flow rate presence or absence determination unit 839 instructs control of the heating state when determining that the actual flow rate is not zero, and instructs control of the heating suppression state when determining that the actual flow rate is zero. The flow rate presence or absence determination unit 839 determines the presence or absence of the actual flow rate from the calculated value of the average flow rate calculation block 803 and the calculated value of the amplitude amount calculation block 804 as described below.

Figure 15:
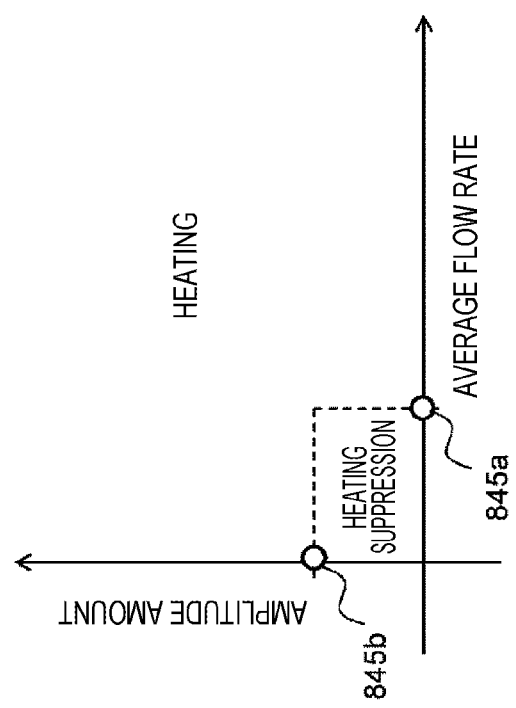
FIG. 15 is a diagram illustrating an outline of the operation of the flow rate presence or absence determination unit 839.

FIG. 15 is a diagram illustrating an outline of the operation of the flow rate presence or absence determination unit 839. The flow rate presence or absence determination unit 839 compares the calculated value of the average flow rate calculation block 803 with an average flow rate threshold value 845a, and compares the calculated value of the amplitude amount calculation block 804 with an amplitude amount threshold value 845b. Then, the flow rate presence or absence determination unit 839 determines that the actual flow rate is zero and instructs control of the heating suppression state when determining that both are below the threshold value, and in other cases, determines that the actual flow rate is not zero and instructs control of the heating state. However, the presence or absence of the actual flow rate determined by the flow rate presence or absence determination unit 839 does not mean strictly zero, but means "relatively small".

Specifically, when the average flow rate calculated by the average flow rate calculation block 803 is larger than the average flow rate threshold value 845a, or when the calculated value of the amplitude amount calculation block 804 is larger than the amplitude amount threshold value 845b, the flow rate presence or absence determination unit 839 determines that the actual flow rate is not zero, and instructs the heating element control internal instruction unit 832 to control the heating state. When the average flow rate calculated by the average flow rate calculation block 803 is equal to or less than the average flow rate threshold value 845a, and the calculated value of the amplitude amount calculation block 804 is equal to or less than the amplitude amount threshold value 845b, the flow rate presence or absence determination unit 839 determines that the actual flow rate is zero and instructs the heating element control internal instruction unit 832 to control the heating suppression state.

According to the above-described third embodiment, the following action and effect can be obtained.

(1) The physical quantity detecting device 300 includes a first flow rate buffer 801, an average flow rate calculation block 803, an amplitude amount calculation block 804, and a flow rate presence or absence determination unit 839 that determines the presence or absence of the flow rate of the fluid to be measured and outputs an operation command to the heating control bridge 640 and the CPU 612 via the heating element control internal instruction unit 832.

The heating control bridge 640 and the CPU 612 operate based on the operation command of the flow rate presence or absence determination unit 389. When the average flow rate is equal to or less than the average flow rate threshold value 845a, and the amplitude amount is equal to or less than the amplitude amount threshold value 845b, the flow rate presence or absence determination unit 839 determines that the flow rate of the fluid to be measured is zero and instructs control of the heating suppression state. When the average flow rate is larger than the average flow rate threshold value 845*a*, or when the amplitude amount is larger than the amplitude amount threshold value 845*b*, the flow rate presence or absence determination unit 839 determines that the flow rate of the fluid to be measured is not zero and instructs control of the heating state. Therefore, since the physical quantity detecting device 300 controls the heating element 608 without receiving an operation instruction from the external ECU 200, control in accordance with a real environment becomes possible, and further improvement in anti-fouling property of the flow rate detection bridge 650 and further power consumption saving are achieved.

Fourth Embodiment

A fourth embodiment of the physical quantity detecting device will be described with reference to FIG. 16. In the following description, the same components as those in the first to third embodiments are denoted by the same reference numerals, and differences will be mainly described. The points not particularly described are the same as those in the first embodiment. The present embodiment is different from the third embodiment mainly in that the heating element control external instruction receiving unit 831 is also included.

Figure 16:
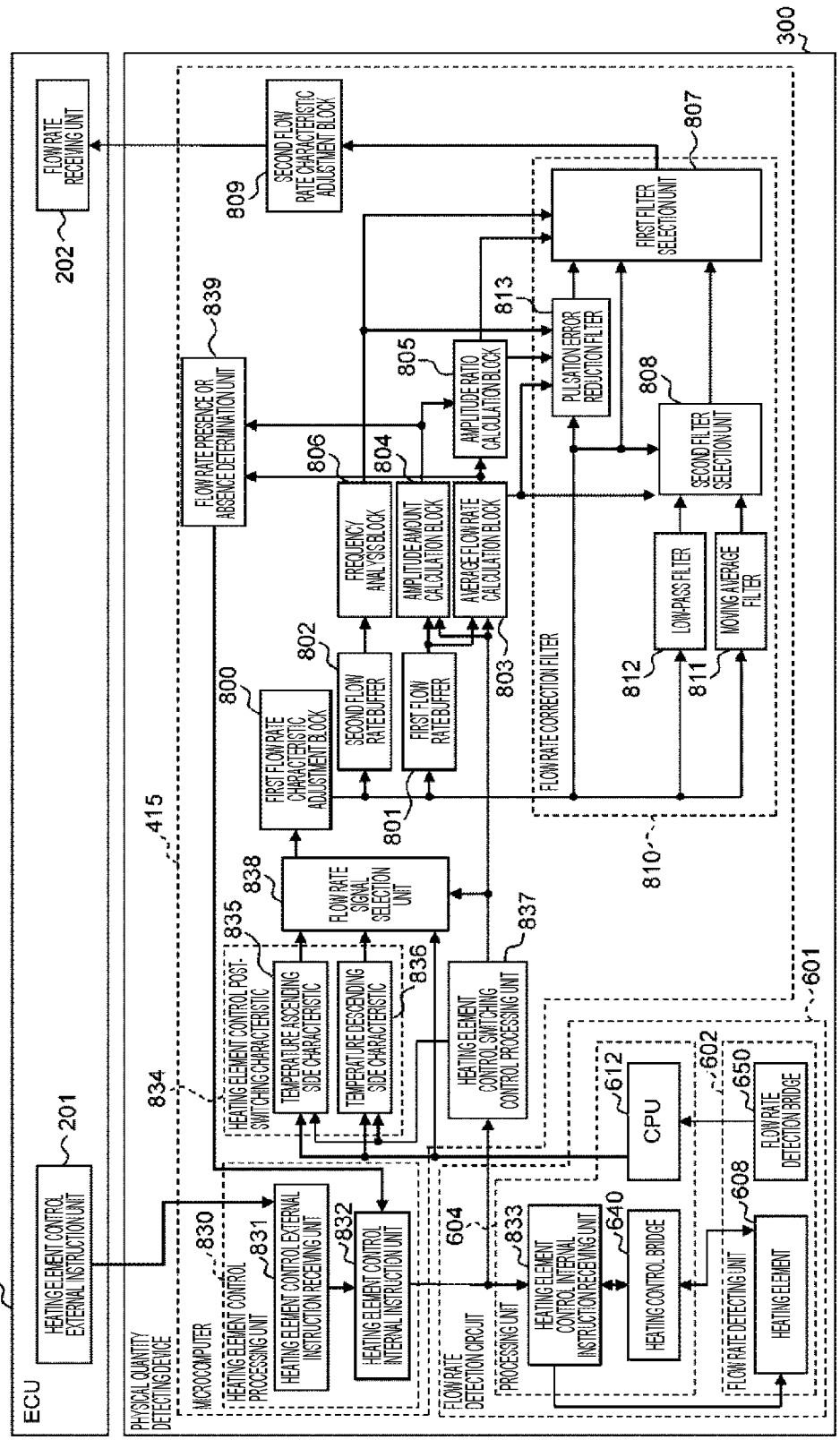
FIG. 16 is a diagram illustrating configurations of the ECU 200 and the physical quantity detecting device 300 according to a fourth embodiment.

FIG. 16 is a diagram illustrating a configuration of a physical quantity detecting device 300 according to the fourth embodiment. The hardware configuration of the physical quantity detecting device 300 according to the present embodiment is the same as that of the third embodiment. The function configuration of the physical quantity detecting device 300 in the present embodiment is different from that of the third embodiment, and is different from that of the third embodiment in that the heating element control external instruction receiving unit 831 is added, and in that the operation of the heating element control internal instruction unit 832 is different.

The operation of the heating element control external instruction receiving unit 831 is the same as that of the first embodiment. The heating element control internal instruction unit 832 instructs the heating element control internal instruction receiving unit 833 to change the control state of the heating element 608 according to the instruction of the heating element control external instruction unit 201 transmitted via the heating element control external instruction receiving unit 831 and the instruction of the flow rate presence or absence determination unit 839. When the instruction of the heating element control external instruction unit 201 and the instruction of the flow rate presence or absence determination unit 839 are different, the heating element control internal instruction unit 832 gives priority to the instruction of the heating element control external instruction unit 201.

According to the above-described fourth embodiment, not only can it be used by connecting to an ECU including the heating element control external instruction unit 201, but also it can be used by connecting to an ECU not including the heating element control external instruction unit 201. Further, when the ECU to be connected includes the heating element control external instruction unit 201, the operation of the heating element 608 gives priority to the instruction of the ECU, so that it is possible to save power in accordance with the operation of the ECU.

(Modification of Fourth Embodiment)

In the above-described fourth embodiment, when the instruction of the heating element control external instruction unit 201 and the instruction of the flow rate presence or absence determination unit 839 are different, the heating element control internal instruction unit 832 gives priority to the instruction of the heating element control external instruction unit 201. However, when the instruction of the heating element control external instruction unit 201 and the instruction of the flow rate presence or absence determination unit 839 are different, the heating element control internal instruction unit 832 may give priority to the instruction of the flow rate presence or absence determination unit 839. According to the present modification, since the transition to the heating suppression state is performed by the determination of the flow rate presence or absence determination unit 839, the power consumption of the physical quantity detecting device 300 can be reduced.

Each of the above-described embodiments and modifications may be combined with each other. Although various embodiments and modifications have been described above, the present invention is not limited to these contents. Other aspects conceivable within the scope of the technical idea of the present invention are also included in the scope of the present invention.

REFERENCE SIGNS LIST 200 electronic control unit
300 physical quantity detecting device
415 microcomputer
601 flow rate detection circuit
602 flow rate detecting unit
604 processing unit
608 heating element
612 CPU
640 heating control bridge
650 flow rate detection bridge
800 first flow rate characteristic adjustment block
801 first flow rate buffer
803 average flow rate calculation block
804 amplitude amount calculation block
805 amplitude ratio calculation block
806 frequency analysis block
807 first filter selection unit
808 second filter selection unit
809 second flow rate characteristic adjustment block
810 flow rate correction filter
811 moving average filter
812 low-pass filter
813 pulsation error reduction filter
830 heating element control processing unit
831 heating element control external instruction receiving unit
832 heating element control internal instruction unit
833 heating element control internal instruction receiving unit
834 heating element control post-switching characteristic
835 temperature ascending side characteristic
836 temperature descending side characteristic
837 heating element control switching control processing unit
839 flow rate presence or absence determination unit

The invention claimed is:
1. A physical quantity detecting device comprising:
a flow rate detecting unit configured to include a heating element to measure a flow rate of a fluid to be measured;
a heating element control unit configured to switch a control state of the heating element to any one of a heating state and a heating suppression state; and a signal processing unit configured to process a measured value of the flow rate detecting unit and, when the heating element control unit switches the control state, process an estimated value determined based on the measured value of the flow rate detecting unit before the switching for a predetermined period immediately after the switching, the signal processing unit comprising a buffer configured to temporarily record the estimated value for a predetermined period in a past, an average flow rate calculation block configured to calculate an average flow rate being an average of the estimated values with reference to the buffer, an amplitude amount calculation block configured to calculate an amplitude amount being an amplitude of the estimated value with reference to the buffer, an amplitude ratio calculation block configured to calculate an amplitude ratio using a calculation result of the average flow rate calculation block and the amplitude amount calculation block, a frequency analysis block configured to perform frequency analysis of the estimated value to calculate a dominant frequency in the estimated value, a pulsation error reduction filter configured to output an estimated value in which effect of pulsation on the estimated value is reduced using an output of the average flow rate calculation block, an output of the amplitude amount calculation block, an output of the amplitude ratio calculation block, and an output of the frequency analysis block, a second filter selection unit configured to output a moving average of the estimated values or a value obtained by applying a low-pass filter to the estimated values based on a magnitude relationship between an output of the average flow rate calculation block and a predetermined first threshold value, and a first filter selection unit configured to output any one of the estimated value, an output of the pulsation error reduction filter, and an output of the second filter selection unit based on a magnitude relationship between an output of the amplitude ratio calculation block and a predetermined second threshold value, and a magnitude relationship between an output of the frequency analysis block and a predetermined third threshold value.

2. The physical quantity detecting device according to claim 1, wherein when the heating element control unit switches the control state, the signal processing unit deletes an estimated value recorded in the buffer, or restricts a reference range of the buffer to an estimated value recorded after the control state is switched.

3. A physical quantity detecting device comprising:
a flow rate detecting unit configured to include a heating element to measure a flow rate of a fluid to be measured;
a heating element control unit configured to switch a control state of the heating element to any one of a heating state and a heating suppression state; and
a signal processing unit configured to process a measured value of the flow rate detecting unit,
wherein when the heating element control unit switches the control state, the signal processing unit processes an estimated value determined based on the measured value of the flow rate detecting unit before the switching for a predetermined period immediately after the switching, wherein the signal processing unit includes flow rate correspondence information indicating a correspondence between a heating state and a heating suppression state of the measured value at a time of settling in a state where a flow rate of the fluid to be measured is identical, and wherein the signal processing unit determines the estimated value based on a control state before switching of the control state and a measured value before switching of the control state with reference to the flow rate correspondence information.

4. The physical quantity detecting device according to claim 3, wherein the signal processing unit sets the measured value as the estimated value after the predetermined period has elapsed.

5. The physical quantity detecting device according to claim
further comprising a signal receiving unit configured to receive a signal for controlling the heating element from outside, and
wherein the heating element control unit changes control of the heating element based on the signal.

6. The physical quantity detecting device according to claim 3,
further comprising:
a buffer configured to temporarily record a measured value for a predetermined period in a past,
an average flow rate calculation block configured to calculate an average flow rate being an average of flow rates with reference to the buffer,
an amplitude amount calculation block configured to calculate an amplitude amount being an amplitude of a flow rate with reference to the buffer, and
a flow rate presence or absence determination unit configured to determine presence or absence of a flow rate of the fluid to be measured to output an operation command to the heating element control unit,
wherein the heating element control unit operates based on the operation command, and
wherein the flow rate presence or absence determination unit determines a flow rate of the fluid to be measured to be zero, and causes the heating element control unit to perform control to the heating suppression state when the average flow rate is equal to or less than a predetermined first threshold value, and the amplitude amount is equal to or less than a predetermined second threshold value, and determines a flow rate of the fluid to be measured not to be zero, and causes the heating element control unit to perform control to the heating state when the average flow rate is larger than a predetermined first threshold value, or the amplitude amount is larger than a predetermined second threshold value.

7. A physical quantity detecting device comprising:
a flow rate detecting unit configured to include a heating element to measure a flow rate of a fluid to be measured;
a heating element control unit configured to switch a control state of the heating element to any one of a heating state and a heating suppression state;
a signal processing unit configured to process a measured value of the flow rate detecting unit and, when the heating element control unit switches the control state, process an estimated value determined based on the measured value of the flow rate detecting unit before the switching for a predetermined period immediately after the switching;

a signal receiving unit configured to receive a signal for controlling the heating element from outside;

a buffer configured to temporarily record a measured value for a predetermined period in a past;

an average flow rate calculation block configured to calculate an average flow rate being an average of flow rates with reference to the buffer;

an amplitude amount calculation block configured to calculate an amplitude amount being an amplitude of a flow rate with reference to the buffer; and a flow rate presence or absence determination unit configured to determine presence or absence of a flow rate of the fluid to be measured to output an operation command to the heating element control unit, wherein the heating element control unit operates based on the signal and the operation command, and wherein the flow rate presence or absence determination unit determines the fluid to be measured to be zero, and causes the heating element control unit to perform control to the heating suppression state when the average flow rate is equal to or less than a predetermined first threshold value, and the amplitude amount is equal to or less than a predetermined second threshold value, and determines the fluid to be measured not to be zero, and causes the heating element control unit to perform control to the heating state when the average flow rate is larger than a predetermined first threshold value, or the amplitude amount is larger than a predetermined second threshold value.

8. The physical quantity detecting device according to claim 7, wherein the heating element control unit prioritizes the signal over the operation command.

9. The physical quantity detecting device according to claim 2, further comprising a signal receiving unit configured to receive a signal for controlling the heating element from outside, wherein, after a certain period, the physical quantity detecting device does not output the measured value, the signal receiving unit receives a signal for the heating element control unit to switch the heating element to the heating suppression state.

10. The physical quantity detecting device according to claim 6, further comprising a signal receiving unit configured to receive a signal for controlling the heating element from outside, wherein, after a certain period, the physical quantity detecting device does not output the measured value, the signal receiving unit receives a signal for the heating element control unit to switch the heating element to the heating suppression state.

11. The physical quantity detecting device according to claim 8, wherein, after a certain period, the physical quantity detecting device does not output the measured value, the signal receiving unit receives a signal for the heating element control unit to switch the heating element to the heating suppression state.

* * * * *